United States Patent [19]

Michelson

[11] 3,841,153
[45] Oct. 15, 1974

[54] GAGE FOR MEASURING THE TENSION IN EXTENSION SPRINGS

[75] Inventor: Louis Michelson, Newton, Mass.
[73] Assignee: Lion Precision Corporation, Newton, Mass.
[22] Filed: Aug. 21, 1972
[21] Appl. No.: 282,328

[52] U.S. Cl. ............... 73/161, 33/172 E, 73/141 A
[51] Int. Cl. ............................................... G01l 1/04
[58] Field of Search ......... 73/161, 141 A; 324/61 P; 33/172 E; 317/246

[56] References Cited
UNITED STATES PATENTS

| | | | |
|---|---|---|---|
| 2,164,453 | 7/1939 | Gaskins | 73/161 |
| 2,272,921 | 2/1942 | Paulson | 73/161 |
| 2,322,681 | 6/1943 | Zenor | 73/382 |
| 2,518,408 | 8/1950 | Weyand | 73/161 |
| 2,784,588 | 3/1957 | Humble et al. | 73/161 |
| 3,012,192 | 12/1961 | Lion | 324/57 R |
| 3,320,672 | 5/1967 | Engle | 33/172 E |
| 3,675,479 | 7/1972 | Carlson | 73/161 |

Primary Examiner—Richard C. Queisser
Assistant Examiner—Daniel M. Yasich
Attorney, Agent, or Firm—Kenway & Jenny

[57] ABSTRACT

A device for measuring the pretension of a coiled extension spring as it is being coiled. The device includes a probe tip connected to an apropriate capacitance sensitive electrical circuit. Mounted on the probe tip is a cantilevered spring, the far end of which is cammed to form a deflecting tip. A moving leaf electrode is fixed to the cantilevered spring and forms a capacitance bridge with a fixed electrode on the probe tip. The coiled spring to be measured is urged against the cammed end of the deflecting tip. The cantilevered spring bends as a result of being cammed up by the coil spring. The motion of the cantilevered spring is translated into a measurement of the pretension of the coil spring by measuring the change in capacitance between the fixed electrode on the probe tip and the moving leaf.

Method for measuring the tension of a coiled spring.

4 Claims, 3 Drawing Figures

GAGE FOR MEASURING THE TENSION IN EXTENSION SPRINGS

BACKGROUND OF THE INVENTION

This invention relates in general to gages for measuring the pretension of coil springs of the extension type and more particularly to a gage which converts variations in the tension of an extension coil spring into variations in electrical capacitance.

Coil springs may be used either as extension springs or compression springs. In the latter type a specific length of wire is wound with specific spaces between individual coils of the spring and the total range of axial compressive movement of the spring is directly related to its free length. In the production of springs of this latter type, the available amount of compression is measured by measuring this free length and one suitable device for measuring the free length of the springs as they are being produced is a capacitance gage, which measures variations in length of the coiled springs by measuring the capacitance between the free end of the spring and a fixed electrode. The second type of coil spring is an extension spring in which the pitch of the coil winding machine is set such that the individual coils of the spring are compressed against one another and the tension which may be exerted by that spring as an extension member is directly related to the prestress applied as the coil is wound. In the past, in order to determine the tension of a coil spring of this type, the completed spring had to be stretched by means of calibrated weights or the like and the extension length compared to the amount of force required to produce that length in the measurement of the tension. Such a technique is awkward for use in controlling the production of springs, since it provides a measurement of the tension of the produced springs only by stopping the production line or with a substantial delay after completion of the spring and hence cannot be used as a basis for more or less continuously adjusting the pitch control of the coil winding machine to provide for a prestressing of the spring within predetermined acceptable limits.

SUMMARY OF THE INVENTION

The gage of the present invention employs a pair of elements in spaced apart confronting relationship with means for measuring variations in spacing between these elements. these means may be optical sensors, eddy current sensors or, in the preferred embodiment capacitance measuring means, with each of the elements constituting electrodes connected to a capacitance measuring circuit so variations in the spacing between the electrodes may be measured by the circuit in terms of the variations in capacitance. One of the electrodes is fixed with reference to the overall measuring system and the other is connected to a cantilever spring carrying on its other edge a camming member. The free end of the coiled extension spring is caused to impinge on the cam and the cantilever spring is driven in a direction normal to the axis of the coiled spring, the amount of motion imparted to the cam being directly related to the shape of the cam surface, the strength of the cantilever spring and the tension of the coiled extension spring. Thus, variations in tension of the extension coiled spring are converted into variations in capacitance, the latter value being measured by an appropriate capacitance measuring bridge. Typically this measurement is carried out by nulling the bridge and the bridge then indicates deviations from an ideal or target tension value. The calibration is carried out by empirical measurements of coil spring tension versus variations in capacitance.

Accordingly, it is an object of the present invention to provide a new and improved device which can measure the tension of a coil spring.

A further object of the invention is to provide a device which will measure the tension of a coil spring by measuring the change in capacitance between two electrodes on the measuring device.

A further object of the invention is to provide a new and improved method for measuring the tension of a coil spring.

DESCRIPTION OF THE PREFERRED EMBODIMENTS

The gage of the present invention is calibrated to measure tension, but in a preferred embodiment the gage's electrical circuit is capacitance sensitive. To accomplish the transformation of capacitance sensitivity to a measurement of tension, the gage is responsive to the changeable distance between two electrodes. This distance, in turn, is arranged to vary with variations in tension of the coil spring through the action of a cam surface and cantilever spring. As the distance between these electrodes varies, so does the electrical capacitance therebetween. The difference in capacitance is measured by a circuit and translated by appropriate empirical calibrations into a measurement of the tension within the coil spring being measured.

With the gage of the present invention, one electrode is fixed in position on a frame, but the other electrode is free to move away from the fixed electrode. A capacitance measuring circuit is connected to the electrodes to provide an output indication of the value of the capacitance between the electrodes. This circuit is generally of the null balancing type such that the output is actually an output signal indicating the deviation in capacitance from an established value of capacitance, for which value the circuit has been nulled.

Figure 1:
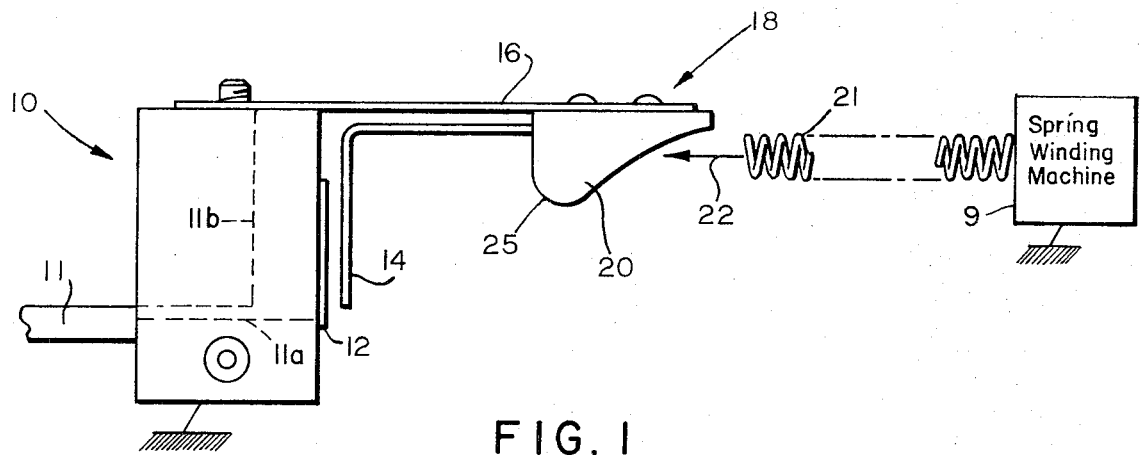
FIG. 1 is a schematic view showing the gage of the present invention in a zero position.

As is shown in FIG. 1, the gage of the present invention includes a probe tip 10. Probe tip 10 may be clamped or otherwise attached to other gages such as spring gages which measure the free length of compression springs as they are being coiled. Probe tip 10 is designed to be connected to an appropriate capacitance circuit by means of leads 11. The probe tip 10 includes two electrodes, a fixed electrode 12 and a movable electrode 14. Fixed electrode 12 is mounted on one face of probe tip 10, while movable electrode 14 is in the form of a moving leaf.

Attached to an upper surface of probe tip 10 is a cantilever spring 16, the far end of which forms a deflecting tip 18. Affixed to the deflecting tip 18 of cantilever spring 16 is a cam 20. Cam 20 may be formed of any suitable material, steel being one example. Although not shown in the drawing, an electrical circuit connecting moving leaf 14 to electrode 12 runs through cam 20 along cantilever spring 16 and into probe tip 10.

Figure 2:
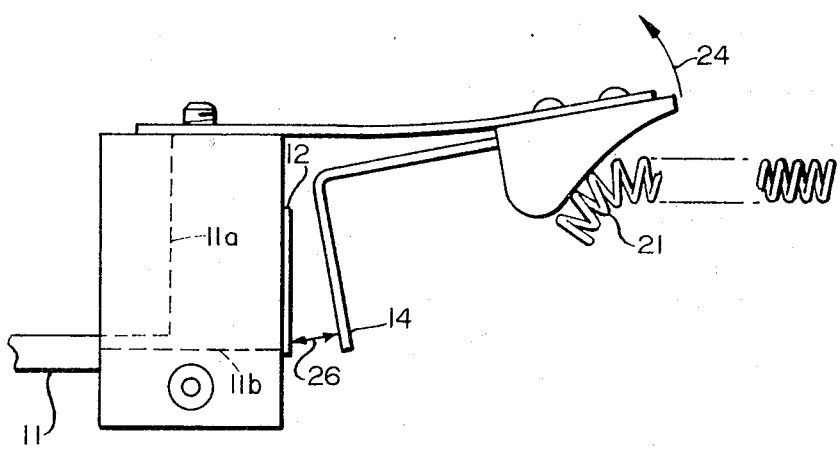
FIG. 2 is a view similar to FIG. 1, but showing the gage measuring the tension of a coil spring.

The operation of the gage of the present invention is shown by comparing the position of movable electrode 14 in FIG. 1 with the position of electrode 14 in FIG. 2.

As shown in FIG. 1, a coil spring 21, as it is being coiled, advances from spring winding machine 9 in the direction of arrow 22 toward cam 20. Although the coil spring 21 is shown with a spacing between the coils to clearly depict the coiled character of the spring, it will be understood that an extension spring in fact has no such spacing between its coils. The force exerted by the tension inherent in the coil spring 21 (due to the natural flexing characteristics of the spring material when it is coiled) will cause an upward deflection of cantilever spring 16 in the direction of arrow 24. The upward deflection of the cantilever spring will in turn cause a widening of gap 26 between electrodes 12 and 14, which in turn will result in a reduction in the value of the capacitance between electrodes 12 and 14. The force causing the deflection is a flexural stress generated by breaking the coils of the spring 21 as it strikes the cam 20. This flexual stress has a constant relationship to the tension of the spring, and is therefore an accurate indication of the tension.

An electrical console unit which provides for readout of the variations in tensions of coiled springs by determining the variations in capacitance, is connected by electrical cables indicated by dotted lines 11a and 11b, to the electrodes 12 and 14. Portions of the circuitry, for example, oscillator drives are preferably located near the electrodes on the probe tip 10.

Figure 3:
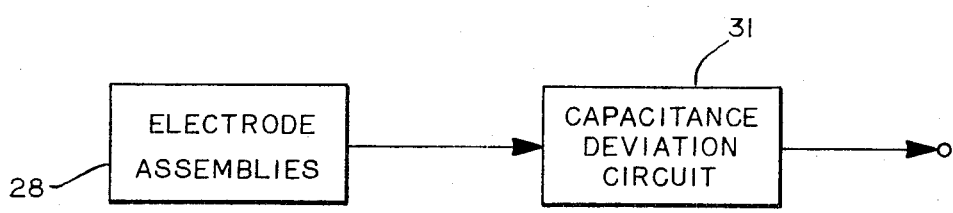
FIG. 3 is an illustration in block diagrammatic form of a measuring gage constructed in accordance with the principles of this invention.

In FIG. 3, the gage of the invention is illustrated in block diagrammatic form. It includes the electrode assembly 28 which is formed by fixed electrode 12 and moving electrode 14. The output from the electrode assembly is applied to a capacitance deviation circuit 31, with the output from this circuit providing an output indication of the tension of the coiled spring. While the capacitance deviation circuit can take any of several conventional forms, one suitable circuit for performing this function is that sold by Lion Precision Corporation of Newton, Mass. under designation Model 300-9B. Similar circuits are described in U.S. Pat. No. 3,012,192, issued on Dec. 5, 1961, the teachings of which are incorporated herein by reference.

In operation, probe tip 10 is mounted so that the gap 26, between the moving leaf 14 and the fixed electrode 12, is a suitable value, for example, 50 thousandths of an inch in the rest position. Thus, the zero calibration on the spring gage is set with gap 26 at this distance, and the capacitance bridge is nulled at this spacing so that movement of the leaf 14 away from the probe produces a decrease in capacitance.

Cam 20 is positioned so that, in use, the upper edge of the coil spring 21 first strikes cam 20. When spring 21 is in the fully wound position, the end of spring 21 causes deflecting tip 18 to deflect in the direction of arrow 24 with spring 21 moving down the cam 20 of deflecting tip 18 as is shown in FIG. 2. The precise shape of the cam surface 20 will depend upon the amount of sensitivity required. However, suitable dimensions for a cam utilized with coils having an extension force of 200gm/mm with a diameter of 2mm, are as follows:

length (along the axis of cantilever 16) . . . 0.81 inches width (perpendicular to the axis of cantilever 16) . . . 0.50 inches.

The face of cam 18 that makes contact with spring 22 is in a plane that is at a 30° angle to the axis of cantilever 16. The back surface 25 of cam 18 is arcuate in shape. The radius of the arc is 0.25 inches.

With probe tip 10 in the position shown in FIG. 2, the coil spring 21 will be deflected by the pressure of cantilever spring 16. Cantilever spring 16, however, will be deflected by the built-in pretension of coil spring 21. The amount of deflection experienced by cantilever spring 16 is determined by the stiffness of the cantilever of the spring and the force exerted against cam 20 by the spring 21 being wound or coiled. The stiffer the coil spring 21 and the more pretension there is in it, the more it will deflect cantilever spring 16. It should be noted that some of the downward deflection of the spring 21 is due to a force of gravity. This gravitational force, however, is negligible in comparison to the spring forces being measured, provided that the spring 21 does not extend unsupported between the spring winding machine 9 and the cam 20 for a long distance.

As set forth above, an increase in the deflection of the cantilever spring 16, increases the width of gap 26 which results in a decrease in capacitance therebetween. The decrease in capacitance is translated into a measurement of tension.

The invention may be embodied in other specific forms without departing from the spirit or essential characteristics thereof. As above indicated the spring between the width of the gap 26 may be sensed by the use of an optical sensor sensing the movement of the element 14, which in this instance need not be an electrode. Similarly this gap 26 could be sensed by sensing the movement of electrode 26 with an eddy current detector. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A gage for measuring an indication of the intercoil tension in a coiled extension spring comprising:

sensing means including a fixed element on said gage and a spaced apart confronting movable element forming a gap therebetween;

a resilient spring member having one end fixed to said gage and the other end coupled by cam means to the movable element, said movable element forming a deflecting tip which deflects and causes a widening of said gap when a force is exerted against it in a first direction;

a measuring means coupled to said fixed and movable elements, said measuring means providing an output signal which varies with variation in said gap between said fixed and movable elements, and means for urging a free end of the coiled extension spring in said first direction into contact with said deflecting tip whereby the force exerted is such that the amount said deflecting tip deflects varies with variations in the tension of said coiled extension of said coiled spring.

2. A gage for measuring an indication of the intercoil tension in a coiled extension spring comprising:
sensing means including a fixed electrode on said gage and a spaced apart confronting movable electrode forming a gap therebetween;
a resilient spring member having one end fixed to said gage and the other end coupled by cam means to the movable electrode, said movable electrode forming a deflecting tip which deflects and causes a widening of said gap when a force is exerted against it in a first direction;
a capacitance measuring circuit connected to said fixed and movable electrodes, said capacitance measuring circuit providing an output signal which varies with variation in measuring capacitance between said fixed and movable electrodes, and means for urging a free end of said coiled extension spring in said first direction into contact with said deflecting tip whereby the force exerted is such that the amount said deflecting tip deflects varies with variations in the tension of said coiled extension spring.

3. The gage as set forth in claim 2 wherein said capacitance measuring circuit is a null type capacitance measuring circuit.

4. A method of measuring an indication of the intercoil tension in a coiled extension spring as it advances from a coil winding machine comprising the steps of:
positioning a first electrode at a fixed distance from said coil windings machine and a second movable electrode a nominal distance from said first electrode to form a variable capacitance; connecting said electrodes to a capacitance measuring circuit;

adjusting the position of said movable electrode relative to the first electrode to provide a gap distance of a desired value;

adjusting the capacitance between said electrodes while said gap distance is at said desired value to provide a predetermined output signal;

providing cam means fastened to said movable electrode and responsive to physical contact by the advancing coiled extension spring to move said movable electrode away from said fixed electrode to widen said gap distance in response to increased inter-coil tension and thereby decrease the capacitance between said electrodes; and providing an output signal in response to said variation in capacitance corresponding to the variations in the tension in said coiled spring.

* * * * *